Patented Oct. 18, 1949

2,485,182

UNITED STATES PATENT OFFICE 2,485,182

ALUMINUM PLATING PROCESS

Arthur Arent, Fort Dodge, Iowa, assignor to Arthur Arent Laboratories, Inc., Des Moines, Iowa, a corporation of Iowa No Drawing. Application April 17, 1945, Serial No. 588,898

9 Claims. (Cl. 117—130)

This invention relates to the art of applying protective coatings or plates to aluminum-containing objects, and more particularly relates to the art of producing corrosion resistant antimony surfaces in commingled union with aluminum-containing metal. Heretofore when it has been necessary to provide corrosion resistant coatings for aluminum, it has been necessary to employ "anodizing" processes in order to obtain a bond between the coating material and the aluminum. Such processes are relatively slow and quite expensive as well as being uncertain in result, and for these reasons the "anodizing" treatment has only been resorted to where the cost factor is not important.

It is an object of the present invention to provide a simple, efficient and economical process of cold-plating aluminum or aluminum-containing metals to render their surfaces corrosion resistant.

Another object of the invention is to provide a simple method of producing aluminum or aluminum-containing objects having a bonded antimony exterior surface, which is highly resistant to corrosive influences such as salt water, salt atmospheres and acid fumes.

A further object of the invention is to provide a corrosion resistant surface coating or surface on aluminum or aluminum-containing objects, which is adapted to receive paints or lacquers in closely adhering relation.

Still another object of the invention is to provide antimony plated aluminum having a high degree of resistance to flame and heat.

Other objects reside in novel steps and treatments, all of which will be fully described in the course of the following description.

The present invention is based on the discovery that anhydrous antimony trichloride when introduced into a saturated sodium chloride brine forms a liquid reaction product which, when brought in contact with aluminum or aluminum-containing metals, reacts therewith, and in the reaction metallic antimony forms on and bonds with the aluminum surface to form a permanent coating or plate in permanently commingled union. The coating or surface so formed varies in color from whitish gray to grayish black depending upon the aluminum content of the metal treated and the length of reaction time in the treatment. All such surfaces present a rather dull appearance lacking in luster, and which is of an even consistency particularly suited for the reception of paint or lacquer in closely adhering relation.

With this understanding of the nature and objects of the present invention, reference will now be made to certain typical treatments in order to better illustrate the practice of the present invention. In preparing the solution for application to the aluminum surfaces, I have found that best results are obtained by using an excess of salt (NaCl) in making up the saturated solution and allowing this excess to remain in the solution during the introduction of the anhydrous antimony trichloride therein.

In so preparing the mixture, I have found that excellent results are obtained if from two to four pounds of the antimony trichloride are introduced into from three to four quarts of the saturated solution containing the excess salt therein. When the two substances are brought together, a rather violent reaction takes place and the mixture should be stirred or continuously agitated throughout the reaction period.

After the reaction is completed, the liquid reaction product should be separated from residual solids by decantation or other suitable method, and this reaction product is taken as the material for treatment of aluminum or aluminum-containing metals.

The solution is used to wet the metallic surface and institute reaction therewith and may be applied as by brushing, immersion or spraying. As soon as the metallic surface is thoroughly wetted, the reaction begins, accompanied by a considerable evolution of heat, and continues for an interval of several minutes unless previously terminated as by rinsing in cold water. The time of immersion or wetting may be varied according to the amount of metallic deposit required, and excellent results have been obtained with a wetting interval of from ten seconds to one minute. When immersion treatments are used, I have found that an average interval of ten seconds is ample for most purposes.

In this reaction, metallic antimony forms on the surface in commingled union with the reacted portion of the aluminum surface and deposits as a hard, tenaciously bonded layer or exterior surface of the aluminum body. If it is desired to arrest the reaction before complete, the wetted surface may be rinsed with cold water, and preferably should be wiped dry with a cloth or other soft absorbent material, or if the reaction is allowed to continue until complete, the surface thereafter should be rinsed and dried as aforesaid to remove unbonded residual solids therefrom.

If it is desired to make aluminum bodies or objects more resistant to destructive influences of heat, all exterior surfaces of the body or object should be treated as aforesaid, and the resulting surface in addition to being highly resistant to corrosion influences, also possesses the property of resisting flame and heat. Where a succession of coats or layers of antimony are desirable, it is possible to apply one coating over another by performing the previously described operation, inclusive of the drying step, and then repeating the operation with the solution applied to the dried coated surface with which it reacts in substantially the same manner as previously described.

As indicated in the foregoing description, variations in the proportioning of ingredients may be availed of within the spirit and scope of the invention. In preparing the solution for treatment, I have indicated a range of from two to four pounds of anhydrous antimony trichloride for each three to four quarts of brine, and in practice I have found that when the quantity of four pounds is used it apparently is the maximum, since some residual crystals remain which do not enter into solution. It is possible that some workable results may be obtained with a lesser quantity than two pounds of the antimony ingredient, but I have found that in order to produce a plating or surface of uniform and proper quality, a minimum amount of two pounds should be used.

Variations in brines may be resorted to as by preparing a saturated calcium chloride brine, a potassium chloride brine and the like, and it also is possible to operate with the brine containing no excess solid as aforesaid, or even one less than completely saturated, although the ability of antimony to form a union with the aluminum is more certain and rapid when the brine is completely saturated and contains the excess salt.

In the preceding description I have referred to aluminum and aluminum-containing metal, and in testing the present invention I have found that excellent results are obtained in the practice of the invention as aforesaid with considerable variation in the aluminum content of the metal treated. As an example, the aircraft industry is now using various types of aluminum compositions, some of which have a pure aluminum outer surface and others of which are aluminum alloys of varying composition. Whenever a substantial quantity of aluminum is present at the surface, the solution is capable of reacting therewith to provide a surface reaction which forms a final surface of uniform texture or consistency.

All the surfaces thus produced are resistant to corrosion, due to the substantial quantity of metallic antimony present, and the commingled union of the antimony with the aluminum provides a metallic surface that is, in fact, an integral part of the metallic body. This condition prevents peeling and permits bending or distortion of the treated metal without any severance of the bond between the antimony and the aluminum. Due to the dull appearance previously described, the treated surface of the aluminum or aluminum-containing metal is well suited for use as an exterior covering for airplanes where it is desired to reduce visibility of the airplane for military or other purposes.

The application of the treatment solution in the manner hereinbefore described is what may be termed a cold plating process in that the solution when maintained at prevailing room temperatures will react readily with the aluminum surfaces. Under some circumstances, it may be preferable to apply the solution with heat and I do not intend the term "cold plating" to exclude such practice, although, as previously noted, the solution generates its own heat to the extent necessary to effect the desired bond.

In the preceding description, I have referred only to the use of anhydrous antimony trichloride as the antimony composition employed to effect the deposition of metallic antimony on the aluminum. I have found that anhydrous antimony trichloride gives superior results because of the ease of use and its effectiveness in producing the desired reactions. However, other combinations of antimony may be used in place of the anhydrous antimony trichloride, such as liquid butter of antimony. Due to the liquid form of such composition, it is more difficult to use and requires a greater quantity of material in obtaining the desired reaction between the antimony and the salt. The results obtained from the use of the latter solution are not the equivalent of the anhydrous antimony trichloride solution, but are workable to a degree and may be resorted to where it is not feasible to use the antimony trichloride mixture previously described.

What I claim and desire to secure by Letters Patent is:

1. The method of cold plating aluminum-containing metals, which comprises wetting the surface of such a metal with the solution reaction product of the intermixture of anhydrous antimony trichloride with a brine selected from a group consisting of sodium chloride, potassium chloride, and calcium chloride brines for an interval sufficient to induce a surface reaction in which metallic antimony forms on the aluminum surface in commingling union therewith.

2. The method of cold plating aluminum-containing metals, which comprises wetting the surface of such a metal with the solution reaction product of the intermixture of anhydrous antimony trichloride with a sodium chloride brine for an interval sufficient to induce a surface reaction in which metallic antimony forms on the aluminum surface in commingling union therewith.

3. The method of cold plating aluminum-containing metals, which comprises wetting the surface of such a metal with the solution reaction product of the intermixture of anhydrous antimony trichloride with a calcium chloride brine for an interval sufficient to induce a surface reaction in which metallic antimony forms on the aluminum surface in commingling union therewith.

4. The method of cold plating aluminum-containing metals, which comprises wetting the surface of such a metal with the solution reaction product of the intermixture of anhydrous antimony trichloride with a potassium chloride brine for an interval sufficient to induce a surface reaction in which metallic antimony forms on the aluminum surface in commingling union therewith.

5. The method of cold plating aluminum-containing metals, which comprises wetting the surface of such a metal with the solution reaction product of the intermixture of anhydrous antimony trichloride with a saturated sodium chloride solution for an interval sufficient to induce a surface reaction in which metallic antimony forms on the aluminum surface in commingling union therewith.

6. The method of cold plating aluminum-containing metals, which comprises wetting the surface of such a metal with the solution reaction product of the intermixture of anhydrous antimony trichloride with a saturated sodium chloride solution containing additional undissolved sodium chloride for an interval sufficient to induce a surface reaction in which metallic antimony forms on the aluminum surface in commingling union therewith.

7. A process according to claim 6, in which the solution ingredients are combined in the proportion of from two to four pounds anhydrous antimony trichloride to from three to four quarts of saturated solution.

8. The method of cold plating aluminum-containing metals, which comprises wetting the surface of such a metal with the solution reaction product of the intermixture of anhydrous antimony trichloride with a brine selected from a group consisting of sodium chloride, potassium chloride, and calcium chloride brines for an interval sufficient to induce a surface reaction in which metallic antimony forms on the aluminum surface in commingling union therewith, rinsing the wetted surface with cold water to remove unbonded ingredients therefrom, and subjecting the rinsed surface when dry to a repetition of said wetting operation.

9. The method of cold plating aluminum-containing metals, which comprises wetting the surface of such a metal with the solution reaction product of the intermixture of anhydrous antimony trichloride with a brine selected from a group consisting of sodium chloride, potassium chloride, and calcium chloride brines for an interval of from ten seconds to one minute to induce a surface reaction in which metallic antimony forms on the aluminum surface in commingling union therewith.

ARTHUR ARENT.

REFERENCES CITED

The following references are of record in the file of this patent:

UNITED STATES PATENTS

| Number | Name | Date |
| --- | --- | --- |
| 1,186,217 | Mark et al. | June 6, 1916 |
| 1,207,218 | Roux | Dec. 5, 1916 |
| 1,211,564 | Eyer | Jan. 9, 1917 |
| 1,436,729 | Scanlan | Nov. 28, 1922 |
| 1,607,676 | Jirotka | Nov. 23, 1926 |
| 1,770,828 | Arent | July 15, 1930 |

OTHER REFERENCES

Mellor: Comprehensive Treatise on Inorganic and Theoretical Chemistry, 1929, vol. 9, p. 474.